(12) United States Patent
Kum

(10) Patent No.: US 10,146,411 B2
(45) Date of Patent: Dec. 4, 2018

(54) METHOD AND APPARATUS FOR PERFORMING OPERATION BY USING INFORMATION INPUT TO TERMINAL IN WHICH VIRTUAL SPACE IS DISPLAYED

(71) Applicant: Samsung Electronics Co., Ltd., Gyeonggi-do (KR)

(72) Inventor: Jun-sang Kum, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 407 days.

(21) Appl. No.: 14/496,659

(22) Filed: Sep. 25, 2014

(65) Prior Publication Data

US 2015/0089388 A1    Mar. 26, 2015

(30) Foreign Application Priority Data

Sep. 25, 2013 (KR) .................. 10-2013-0114141

(51) Int. Cl.
| | |
|---|---|
| G06F 3/00 | (2006.01) |
| G06F 3/0484 | (2013.01) |
| G06T 19/00 | (2011.01) |
| H04L 29/08 | (2006.01) |
| G06F 3/0481 | (2013.01) |
| G06F 3/0482 | (2013.01) |

(52) U.S. Cl.
CPC ........ G06F 3/04842 (2013.01); G06F 3/0482 (2013.01); G06F 3/04815 (2013.01); G06F 2201/815 (2013.01); G06T 19/006 (2013.01); H04L 67/1097 (2013.01)

(58) Field of Classification Search
None
See application file for complete search history.

(56) References Cited

U.S. PATENT DOCUMENTS

| | | | |
|---|---|---|---|
| 7,636,900 B2 | 12/2009 | Xia | |
| 2007/0150810 A1 | 6/2007 | Katz et al. | |
| 2008/0172635 A1* | 7/2008 | Ross | ........... G06F 3/04815 715/826 |
| 2009/0125481 A1* | 5/2009 | Mendes da Costa | ... A63F 13/12 |

FOREIGN PATENT DOCUMENTS

| | | |
|---|---|---|
| JP | 2002-157209 | 5/2002 |
| KR | 10-1037823 | 12/2010 |
| KR | 20100132795 A  * | 12/2010 |

OTHER PUBLICATIONS

Dan Lake et al., Distributed Scene Graph to Enable Thousands of Interacting Users in a Virtual Environment, Nov. 2010, IEEE, pp. 1-6 (Year: 2010).*

Heikki Laaki et al., Augmenting Virtual worlds with real-life data from mobile devices, 2010, IEEE, pp. 281-282 (Year: 2010).*

* cited by examiner

*Primary Examiner* — Tam T Tran

(74) *Attorney, Agent, or Firm* — The Farrell Law Firm, P.C.

(57) ABSTRACT

A method of performing an operation by using information that is input to a terminal is provided. The method includes generating a first virtual space that includes at least one object, and displaying the first virtual space on a screen of the terminal; selecting one of the at least one object, based on location information about a character in the first virtual space; and performing the operation that corresponds to the selected object, based on information about the selected object.

13 Claims, 9 Drawing Sheets

METHOD AND APPARATUS FOR PERFORMING OPERATION BY USING INFORMATION INPUT TO TERMINAL IN WHICH VIRTUAL SPACE IS DISPLAYED

PRIORITY

This application claims priority under 35 USC § 119(a) to Korean Patent Application No. 10-2013-0114141, filed on Sep. 25, 2013, in the Korean Intellectual Property Office, the entire disclosure of which is incorporated herein by reference.

BACKGROUND

1. Field of the Invention

The present invention generally relates to a method and an apparatus for performing an operation by using information that is input to a terminal in which a virtual space is displayed.

2. Description of the Related Art

A user interface, which represents an application installed in a terminal, appears as an icon in the form of a shape for showing a function of the application on a screen of the terminal. A user selects a desired application by using a method such as touching the icon that is displayed on the screen of the terminal. Then, the terminal performs a function of the selected application.

If icons that correspond to respective applications are disposed in the form of a two-dimensional (2D) array on the terminal screen, a user may intuitively understand functions of the applications, and easily select a desired application. While this may allow a user to intuitively select an icon, it is not fun or enjoyable to use.

Additionally, in the case of an App store, which is currently based on a 2D user experience (UX), applications that are registered at the App store are displayed in the form of a list on the terminal screen. Accordingly, a user may be limited in terms of finding a necessary application and experiencing a function of the application. Additionally, the App store currently employs a method of searching for an application based on text, or placing an application with a high degree of recognition at a high position in a retrieval ranking. However, it may be difficult for a user to find an application that provides a function that the user desires at that point in time.

SUMMARY

The present invention has been made to address at least the above problems and disadvantages and to provide at least the advantages described below. Accordingly, an aspect of the present invention provides a method and an apparatus for performing an operation, by using information that is input to a terminal in which a virtual space is displayed.

According to an aspect of the present invention, a method of performing an operation by using information that is input to a terminal includes generating a first virtual space that includes at least one object, and displaying the first virtual space on a screen of the terminal; selecting one of the at least one object, based on location information about a character in the first virtual space; and performing an operation that corresponds to the selected object, based on information about the selected object.

According to another aspect of the present invention, a non-transitory computer-readable storage medium includes a storage medium having stored thereon a computer program, which when executed by a computer, performs the method.

According to another aspect of the present invention, an apparatus for performing an operation by using input information includes a virtual space generation unit for generating a first virtual space that includes at least one object; an interface unit for displaying the first virtual space on a screen of the apparatus; an object selection unit for selecting one of the at least one object, based on location information about a character in the first virtual space; and an operation performing unit for performing an operation that corresponds to the selected object, based on information about the selected object.

BRIEF DESCRIPTION OF THE DRAWINGS

These and other aspects and features of the present invention will become apparent and more readily appreciated from the following detailed description of embodiments of the present invention, taken in conjunction with the accompanying drawings, in which.

DETAILED DESCRIPTION OF EMBODIMENTS OF THE PRESENT INVENTION

Figure 1:
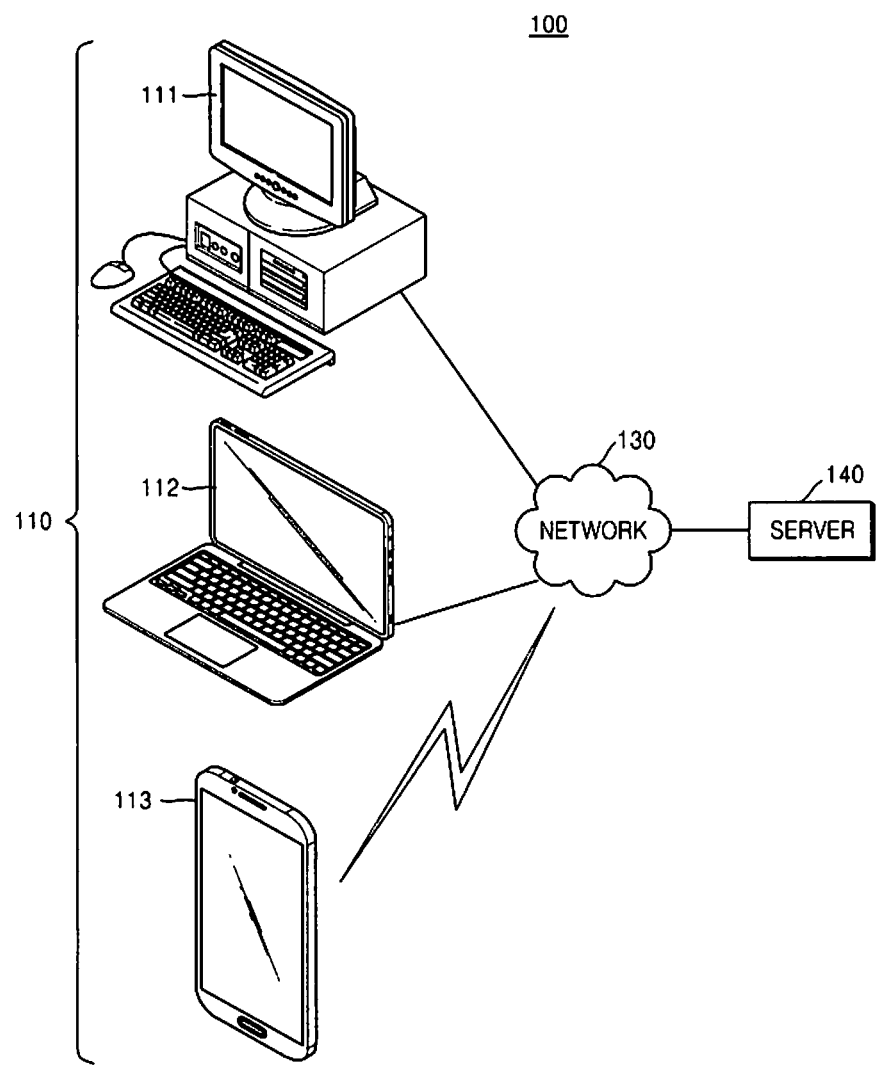
FIG. 1 illustrates an example of a display system according to an embodiment of the present invention.

Reference will now be made in detail to embodiments, examples of which are illustrated in the accompanying drawings, wherein like reference numerals refer to like elements throughout. In this regard, the embodiments of the present invention may have different forms and should not be construed as being limited to the descriptions set forth herein. Accordingly, the embodiments are merely described below, by referring to the figures, to explain aspects of the present invention. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates an example of a display system 100 according to an embodiment of the present invention.

Referring to FIG. 1, the display system 100 includes at least one terminal 110 and a server 140. For example, the terminals 110 may be connected to the server 140 via a network 130. The terminals 110 may include a desktop computer 111 or a laptop computer 112, and a smartphone 113. However, the terminals 110 are not limited thereto. In other words, the terminals 110 may be any elements that may be connected to the server 140 by using wired or wireless communication. For example, the terminals 110 may include a tablet personal computer (PC) or a smart watch.

Hereinafter, for convenience of description, the terminal 110 is assumed to be a smartphone that includes a touch-screen. Accordingly, the terminal 110 may receive information by using a user's gesture, as well as from a keypad, a mouse, or an electronic pen.

The server 140 transceives information with the terminal 110 via the network 130. An example of such information, transceived by the server 140 with the terminal 110, will be described in detail below by referring to FIGS. 2 through 10.

However, according to an embodiment of the present invention, the server 140 may not be an element of the display system 100. For example, if a virtual space that will be described below includes only an object, which corresponds to an application that is installed in the terminal 110, and it may not be necessary for the terminal 110 to transceive information with another terminal of a user that uses the terminal 110 or a terminal of another user, the server 140 may not be included in the display system 100.

In other words, if only objects for an operation that may be performed by the terminal 110 are provided in a virtual space, embodiments of the present invention may be implemented even if the display system 100 does not include the server 140. However, if a character of the user and a character of another user are displayed together in a virtual space, or the user interacts with another user, for example, chats with or transmits a message to another user via a character that is displayed in the virtual space, it may be necessary for the display system 100 to include the server 140. Additionally, when an object, which may interwork with a virtual space of another user or a service that is provided by another user, is to be displayed in a virtual space that is displayed in the terminal 100, it may be necessary for the display system 100 to include the server 140.

A plurality of the terminals 110, connected to the server 140 via the network 130, may be terminals that are owned respectively by different users or may be a plurality of terminals that are owned by the same user.

Hereinafter, according to an embodiment of the present invention, and referring to FIGS. 2 through 10, a method of performing by the terminal 100 an operation by using information that is input to the terminal 100, will be described in detail.

Figure 2:
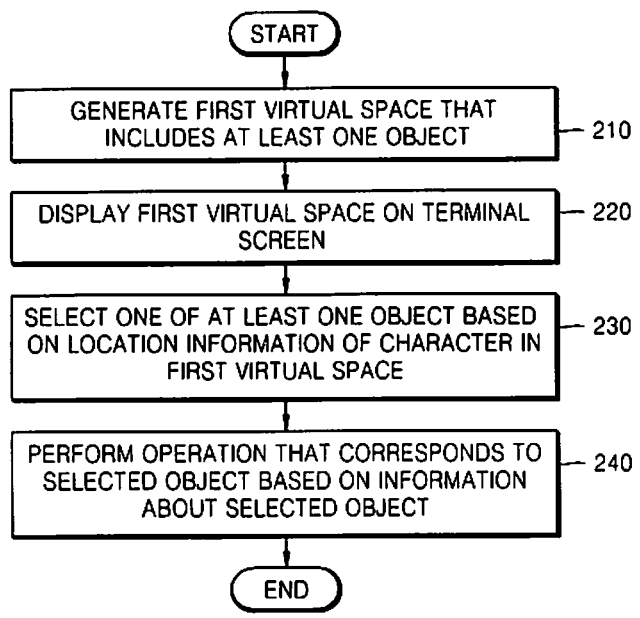
FIG. 2 is a flowchart illustrating an example of an operation performed by a terminal according to an embodiment of the present invention.

FIG. 2 is a flowchart illustrating an example an operation performed by the terminal 100.

In step 210, the terminal 100 generates a first virtual space that includes at least one object. The first virtual space may include an object, which corresponds to an application that is installed in the terminal 100. Additionally, the first virtual space may be a space that is presented in a two-dimensional (2D) form or a three-dimensional (3D) form.

Hereinafter, referring to FIG. 3, the first virtual space will be described in detail.

Figure 3:
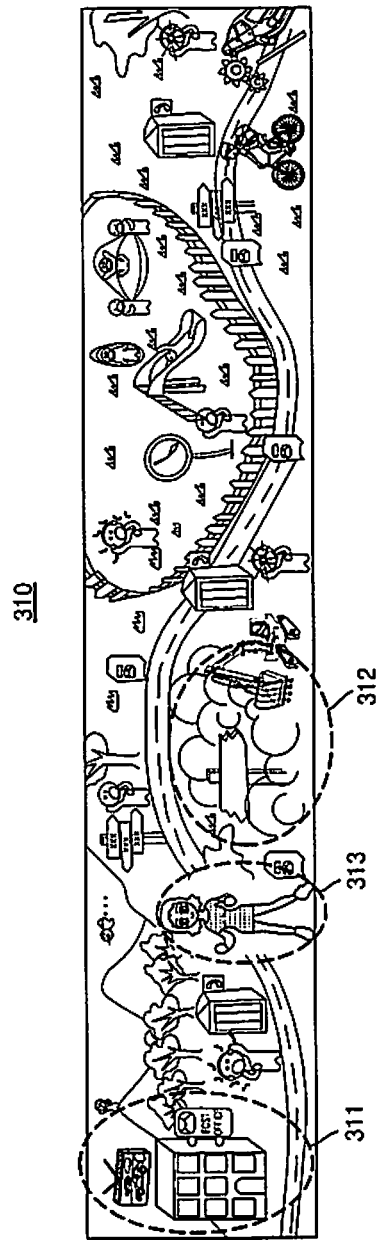
FIG. 3 illustrates an example of a first virtual space according to an embodiment of the present invention.

FIG. 3 illustrates an example of a first virtual space 310 according to an embodiment of the present invention.

Referring to FIG. 3, the first virtual space 310 is shown as a space in which a village is configured, but is not limited thereto. For example, the first virtual space 310 may be a space that consists of a room, a living room, or a kitchen which are included in a house. In other words, if the first virtual space 310 is a space that displays an object, which represents an operation that is to be performed by the terminal 110. A theme that may be configured in the first virtual space 301 is not limited.

Additionally, a size of the first virtual space 310 is not limited. In other words, a size of the first virtual space 310 may be such that the whole first virtual space 310 is displayed on a screen of the terminal 110. Alternately, a size of the first virtual space 310 may be such that only a partial area of the first virtual space 310 is displayed on the screen of the terminal 110, and as the screen moves corresponding to a moving command signal that is input to the terminal 110, remaining area of the first virtual space 310 may be displayed on the screen of the terminal 110.

At least one object 311 or 312 may be displayed in the first virtual space 310. Each object 311 or 312 represents an operation that may be performed by the terminal 110. For example, the object 311 or 312 may represent an application that is installed in the terminal 110.

For example, assuming that a building 311, which is configured to look like a post office, is displayed in an area of the first virtual space 310, the building 311 may represent a message function that is performed by the terminal 110. In other words, the object corresponding to an application via which the terminal 110 transceives a message with another terminal, is the building 311 that is configured as a post office, and is displayed in the first virtual space 310.

Additionally, an object that is displayed in the first virtual space 310 may represent an application that is currently being installed in the terminal 110. For example, the object representing an application that is currently being installed in the terminal 110, may be displayed as object 312 which is built as a particular building in an area of the first virtual space 310.

Together with the object 311 or 312 which represent operations to be performed by the terminal 110, a character 313 of a user may be displayed in the first virtual space 310. Hereinafter, referring to FIG. 4, the character 313 is described in detail.

Figure 4:
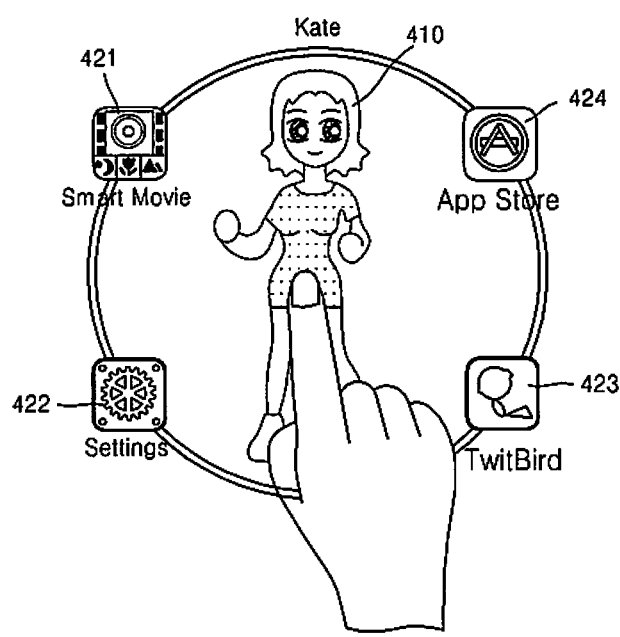
FIG. 4 illustrates an example of a character according to an embodiment of the present invention.

FIG. 4 illustrates an example of a character 410 (corresponding to character 313 of FIG. 3) according to an embodiment of the present invention.

The character 410 is an avatar that is generated by a user. The character 410 is located in a virtual space, and performs an operation in the virtual space according to an input signal from a user. The virtual space, in which the character 410 is located, may be the first virtual space, or a second or third virtual space that will be described below. Additionally, an operation that is performed by the character 410 may correspond to moving in a virtual space, generation of an object which was described with reference to FIG. 3, or execution of a mission which will be described below with reference to FIG. 6.

At least one object 421 through 424, which represent an operation that may be performed by the terminal 110, is displayed in a location adjacent to the character 410 in the virtual space. In other words, an object 421, 422, 423, or 424 may be displayed adjacent to the character 410, as well as in a certain area (of the object 311 or 312, shown in FIG. 3) of a virtual space in which the character 410 is located, for example, the first virtual space. Accordingly, a user may quickly select an object that represents a function that is to be performed by the terminal 110.

When a program that displays a virtual space (for example, the first space) on the terminal 110 is first executed, the user may generate the character 410 and a user account. Hereinafter, referring to FIG. 5, a method of generating a user account and the character 410 will be described in detail.

Figure 5:
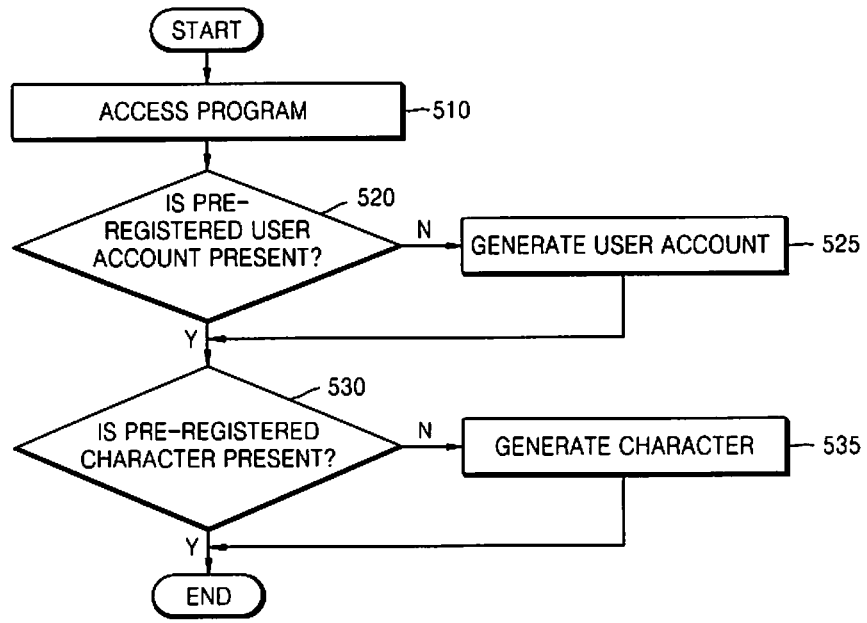
FIG. 5 is a flowchart illustrating an example of generating a user account and a character, which is performed by a terminal, according to an embodiment of the present invention.

FIG. 5 is a flowchart illustrating an example of generating a user account and a character, which is performed by the terminal 110, according to an embodiment of the present invention.

In step 510, a user accesses a program via the terminal 110. The term "program" refers to a program for displaying a virtual space (for example, the first virtual space) on a screen of the terminal 110.

In step 520, the terminal 110 checks whether a pre-registered user account is present. For example, the terminal 110 may display a separate window that requires an input of a user account on the screen. According to whether the user inputs a user account or selects a button for requesting generation of a new user account, the terminal 110 may check whether a pre-registered user account is present.

If the terminal 110 determines that a pre-registered user account is present, the terminal proceeds to step 530. If not, the terminal proceeds to step 525.

In step 525, the terminal 110 generates a user account according to a received external signal. For example, the terminal 110 may display a separate window that requires the user to input a character or the like to be registered as a new user account. When the user inputs a character or the like to be registered as a new account on the screen of the terminal 110, the terminal 110 generates a new user account corresponding to information that is obtained from the input. The terminal 110 may store the generated user account in a storage unit (not illustrated) included in the terminal 110. Additionally, the terminal 110 may transmit information about the generated user account to the server 140 via the network 130, and the server 140 may store the transmitted information about the user account.

If the server 140 determines that a pre-registered user account and the new user account that is transmitted by the terminal 110 are the same, the server 140 transmits information, which shows that a new user account cannot be generated, to the terminal 110 via the network 130. If the terminal 110 receives from the server 140 the information that shows that a new user account cannot be generated, the terminal 110 may display a separate window, which requires the user to re-input a character that will be registered as a new user account, on the screen.

Additionally, in step 530 the terminal 110 checks if a pre-registered character is present by transmitting a signal for requesting a check to see f a pre-stored character of the user is present to the server 140 via the network 130, and receiving information from the server 140.

If the terminal 110 determines that a pre-registered character is present, the terminal displays the pre-registered character on the screen to finish the process. If the pre-registered character is not present, the terminal 110 proceeds to step 535. The terminal 110 may output a separate window for asking the user a question about whether to generate a new character in addition to the pre-registered character on the screen of the terminal 110, and thus determine whether to generate a new character according to a signal input by the user.

In step 535, the terminal 110 generates a character according to a received external signal. For example, the terminal 110 may receive information that may determine a shape of a character, such as, for example, a height, an appearance, a gender or the like, and generate a character that corresponds to the received information. Information that is received from the user by the terminal 110 is not limited to the information about the shape of the character. In other words, the terminal 110 may receive various information about a personality, a birthday, a hobby, or the like of a character, and generate a character that corresponds to the received information.

The terminal 110 may store the generated character in the storage unit that is included in the terminal 110. Additionally, the terminal 110 may transmit information about the generated character to the server 140 via the network 130, and the server 140 may store information about the transmitted character.

As described above, the user may generate a character that corresponds to the user's unique account and a generated account, and arrange the character in a virtual space that is displayed on the screen of the terminal 110 (for example, the first virtual space) so as to perform various operations. Thus, the user may have fun and enjoy using the terminal 110.

Referring back to FIG. 2, in step 220, the terminal 110 displays the first generated virtual space on the screen of the terminal 110. Additionally, the terminal 110 may display a generated character in the first virtual space on the screen of the terminal 110.

The terminal 110 may store information about the generated first virtual space and character in the storage unit that is included in the terminal 110. Additionally, the terminal 110 may transmit the information about the generated first virtual space and character to the server 140 via the network 130, and thus, the server 140 may store the information about the generated first virtual space and character.

In step 230, the terminal 110 selects one object of the at least one object based on location information of the character in the first virtual space.

For example, the terminal 110 detects changed location information of the character in the first virtual space by using a received external signal. Then, the terminal 110 selects an object that is adjacent to the character, based on the detected location information of the character.

Referring back to FIG. 3, the character 313 may move freely in the first virtual space 310. For example, the user may input a signal for moving the character 313 by touching or clicking on a certain point of the screen of the terminal 110 or manipulating a keypad that is included in the terminal 110.

The terminal 110 moves the character 313 in the first virtual space 310 by using a signal that is received from the user, and outputs an image in which the character 313 is moved on the screen of the terminal 110. For example, the terminal 110 calculates location information that corresponds to information that is received from the user. Additionally, the terminal 110 identifies a current location of the character 313 in the first virtual space 310 and outputs an image, in which the character 313 is moved to the calculated location, to the screen of the terminal 110.

Then, the terminal 110 selects the object 311 or 312 that is present in an area adjacent to the location to which the character 313 has moved. For example, the terminal 110 determines whether the object 311 or 312 is present within a certain range of the location of the character 313. If the object 311 or 312 is present within the certain range, the terminal 110 selects the corresponding object 311 or 312.

The terminal 110 notifies the user that the selected object 311 or 312 is present, by displaying the selected object 311 or 312 to be different from surroundings of the selected object 311 or 312. For example, this may be done by displaying only the object 311 or 312 with an embossed appearance or in a blinking state.

Referring back to FIG. 2, in step 240, the terminal 110 performs an operation that corresponds to the selected object based on information about the selected object.

As described above, each of objects displayed in a virtual space (for example, the first virtual space) represents an operation that may be performed by the terminal 110. Accordingly, the terminal 110 performs an operation that corresponds to the selected object, which may be an object that represents an application that is installed in the terminal 110.

For example, assuming that the selected object is an object which represents a music playing application that is installed in the terminal 110, the terminal 110 shifts the first virtual space to a screen in which music may be played, for example, a screen that displays a list of music files, and displays the screen. Additionally, the terminal 110 plays a selected music file based on an input signal that is received from the user.

As described above with reference to FIGS. 2 through 4, the user may select an object which is present in the first virtual space that is displayed on the screen of the terminal 110, and thus, transmit a signal to the terminal 110 for commanding the terminal 110 to perform the user's desired function. In this case, the user may view an image, in which an object is selected, via a character that is located in the virtual space. Thus, the user may have more fun, compared to a currently-used method of selecting one of icons that are presented in a 2D form.

The first virtual space generated by the terminal 110 may be updated when a predetermined condition is met. For example, an area of the virtual space may be expanded, or a number of objects located in the virtual space may be increased or decreased. Hereinafter, referring to FIG. 6, a method of updating a virtual space, performed by the terminal 110, will be described in detail.

Figure 6:
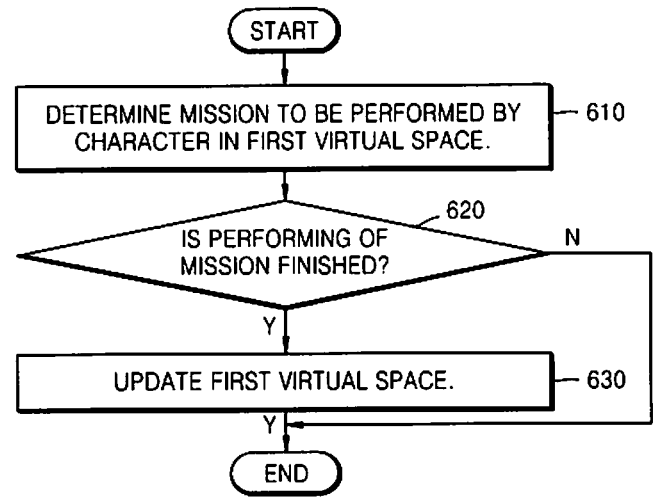
FIG. 6 is a flowchart illustrating an example of updating a virtual space, which is performed by a terminal, according to an embodiment of the present invention.

FIG. 6 is a flowchart illustrating an example of updating a virtual space which is performed by the terminal 110, according to an embodiment of the present invention.

In step 610, the terminal 110 determines a mission to be performed by a character in the first virtual space.

The term "mission" refers to a condition under which the first virtual space may be updated. For example, the terminal 110 may determine a mission in which the character constructs a new object or cultivates a field in the first virtual space, and may display a separate window for notifying the user of the determined mission. The user performs the mission by transmitting a signal for controlling an operation of the character to the terminal 110 by using a method of inputting a gesture on a touchscreen or using an additional input apparatus, for example, a keypad or a mouse.

The mission may be performed by using a character of another user together with a character of the user. In other words, when a character of the user and a character of another user are present in the same virtual space (for example, the first virtual space) the terminal 110 may determine a mission that may be performed by using the character of the user and the character of the other user together. Since the terminals 110 are connected to each other via the network 130 as shown in FIG. 1, different users may perform the same mission together by controlling characters using each of the terminals 110. A method in which the character of the user and the character of the other user may be present in the first virtual space will be described in detail below by referring to FIG. 7.

In step 620, the terminal 110 determines whether the character has finished performing the mission. In other words, the terminal 110 determines whether the character has finished a mission having a certain condition in the first virtual space. For example, assuming that a mission is to harvest a carrot in a field within 24 hours, the user controls the character by using the terminal 110, to determine whether the carrot is harvested in the field within 24 hours.

If the terminal 110 determines that the performing of the mission is finished, the terminal 110 proceeds to step 630. If the terminal 110 determines that performing the mission is not finished, no further operation is performed.

In step 630, the terminal 110 updates the first virtual space. For example, the terminal 110 expands an area of the first virtual space, or increases or decreases a number of objects that are located in the first virtual space. Additionally, the terminal 110 may change a configuration of an object that is already present in the first virtual space. In other words, if the terminal 110 changes the current first virtual space, a target of the changing is not limited.

The terminal 110 may store information about the updated first virtual space in the storage unit that is included in the terminal 110. Additionally, the terminal 110 may transmit the information about the first virtual space to the server 140 via the network 130, and thus, the server 140 may store the information about the updated first virtual space and character.

As described above, the terminal 110 may update an already-generated virtual space, and this may arouse a user's interest. Additionally, the terminal 110 may update a virtual space that is generated by the user according to a result of performing a mission. Thus, the user's interest in the virtual space may be improved.

Referring back to FIG. 1, a plurality of the terminals 110 may be connected to each other via the network 130. A plurality of the terminals 110 may be terminals that are respectively owned by different users or terminals that are owned by the same user.

If a plurality of the terminals 110 are terminals that are owned by the same user, the same virtual space may be displayed on each of screens of the terminals 110. In other words, as described with reference to FIG. 5, the user may generate a user account, and the generated user account may be stored in the server 140 via the network 130. Accordingly, if terminals 110 are connected to each other under the same user account, the same virtual space may be displayed regardless of a type and a number of the terminals 110.

The same virtual space includes a result in which the virtual space is updated. For example, if the second terminal 112 updates the first virtual space of the user, the second terminal 112 transmits information about the updated virtual space to the server 140 via the network 130. Then, if the user executes a program under the same user account by using the first terminal 111, the first terminal 111 receives information about the updated virtual space from the server 140, and displays the information on the screen.

The terminal 110 may display a screen in which a virtual space that is generated by a terminal of another user or a service that is provided by another user is shown. Hereinafter, this is described in detail by referring to FIG. 7.

Figure 7:
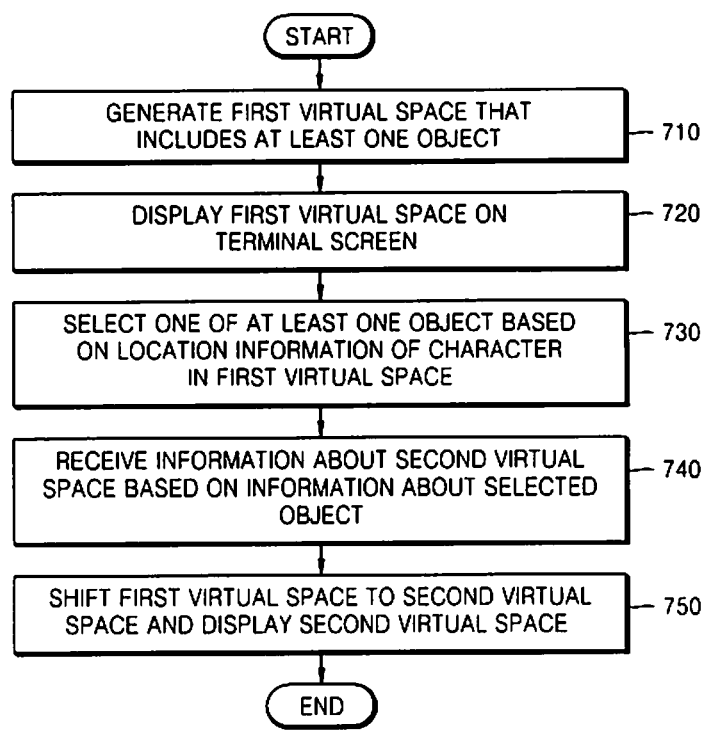
FIG. 7 is a flowchart illustrating an example of displaying another virtual space on a screen, which is performed by a terminal, according to an embodiment of the present invention.

FIG. 7 is a flowchart illustrating an example of displaying another virtual space on the screen, which is performed by the terminal 110, according to an embodiment of the present invention.

Referring to FIG. 7, steps 710 through 730 are the same as steps 210 through 230 that are described above with reference to FIG. 2. Accordingly, a detailed description of steps 710 through 730 will not be provided here for conciseness.

However, the object, which was selected by the terminal 110 in step 230 of FIG. 2, represents an operation that may be performed by the terminal 110. On the contrary, an object, which is selected by the terminal 110 in step 730 of FIG. 7, represents another virtual space (hereinafter referred to as a second virtual space). Accordingly, the object that is shown in step 230 and the object that is shown in step 730 of FIG. 7 are different from each other. In other words, according to the embodiment of the present invention described with reference to FIG. 2, the terminal 110 displays a screen in which a function that corresponds to a selected object is to be performed. However, according to the present embodiment with reference to FIG. 7, the terminal 110 displays the second virtual space that corresponds to a selected object.

In step 740, the terminal 110 receives information about the second virtual space based on information about the selected object. For example, the terminal 110 transmits a signal for requesting transmission of information about the second virtual space to the server 140 via the network 130, and thus receives the information about the second virtual space from the server 140.

In step 750, the terminal 110 shifts the first virtual space to the second virtual space, and thus displays the second virtual space. In other words, the terminal 110 shifts the first virtual space, which is already displayed on the screen, to the second virtual space and displays the second virtual space, by using the information that is received from the server 140.

The second virtual space may include an object, which interworks with a third virtual space that is generated by a terminal of another user, and an object, which interworks with a service that is provided by another user. Hereinafter, referring to FIGS. 8A and 8B, the second virtual space is described in detail.

Figure 8A:
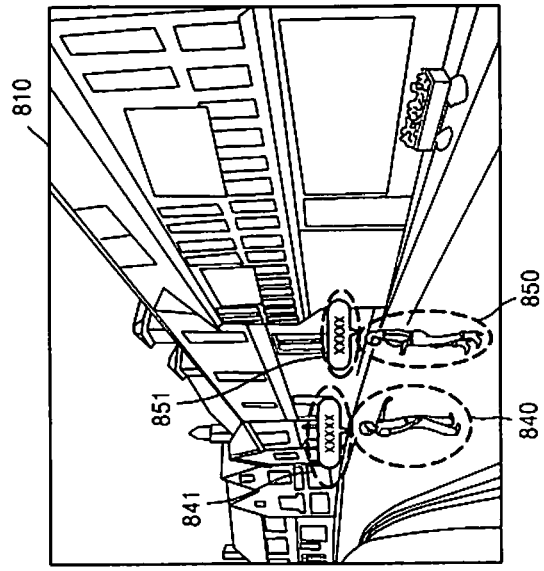
FIGS. 8A and 8B illustrate examples of a second virtual space according to an embodiment of the present invention.
Figure 8B:
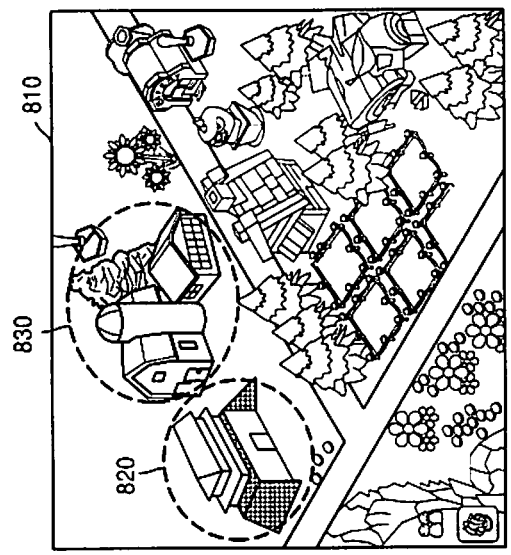

FIGS. 8A and 8B illustrate an example of a second virtual space 810 according to an embodiment of the present invention.

Referring to FIG. 8A, the second virtual space 810 includes at least one of objects 820 and 830. According to an embodiment of the present invention, the second virtual space 810 includes the objects 820 or 830 which may interwork with virtual spaces of other users or a service that is provided by another user.

Referring to FIG. 8A, the second virtual space 810 is shown as a space in which a town is configured, but is not limited thereto. In other words, if the second virtual space 810 is a space in which the objects 820 or 830, which may interwork with virtual spaces of other users or a service that is provided by another user, may be displayed, a theme that is configured in the second virtual space 801 is not limited.

Additionally, a size of the second virtual space 810 is not limited. In other words, a size of the second virtual space 810 may be such that the whole second virtual space 810 is displayed on a screen of the terminal 110. Alternately, a size of the first virtual space 810 may be such that only a partial area of the second virtual space 810 is displayed on a screen of the terminal 110, and as the screen moves corresponding to a moving command signal that is input to the terminal 110, a remaining area of the second virtual space 810 may be displayed on the screen of the terminal 110.

A character of the user is located in the second virtual space 810. Accordingly, as described with reference to FIG. 3, the user may change a location of the character in the second virtual space 810 by touching a certain point of the screen of the terminal 110 or manipulating an input apparatus, such as a keypad or a mouse that is included in the terminal 110.

In detail, the user inputs a signal for instructing to move the character to a certain location by using a touchscreen or an input apparatus to the terminal 110. The terminal 110 displays an image in which the character is moved to a certain location, by using the input signal. Then, as described with reference to step 230 of FIG. 2, the terminal 110 selects the object 820 or 830 that is present in an area adjacent to the location where the character has moved.

The selected object 820 or 830 may be an object which interworks with a third virtual space that is generated by a terminal of another user, or an object which interworks with a service that is provided by another user. For example, assuming that the selected object 820 or 830 is an object that interworks with the third virtual space which is generated by a terminal of another user, the terminal 110 shifts the second virtual space, displayed on the screen, to the third virtual space and displays the third virtual space.

Assuming that the selected object 820 or 830 interworks with a service that is provided by another user, the terminal 110 shifts the second virtual space to a screen in which a service may be used. The service that is provided by another user may be an App store or the like, but is not limited thereto.

According to an embodiment of the present invention, the second virtual space 810 may include an object that interworks with a service provided by another user. Thus, according to an embodiment of the present invention the server 140 may allocate a certain area of the second virtual space 810 to another user. A method of allocating a certain area of the second virtual space 810 to another user, which is performed by an user who operates the server 140 will be described in detail below by referring to FIG. 9.

Referring to FIG. 8B, the respective characters 840 or 850 of a plurality of users are located in the second virtual space 810. A name or nickname 841 or 851 of a user may be displayed in a location adjacent to a shape of the respective character 840 or 850. Accordingly, the user may chat with or transmit a message to another user. In other words, the terminal 110 performs a function of chatting or transmitting a message between the plurality of users by transceiving information with terminals of the other users, which are connected to each other via the network 130.

Figure 9:
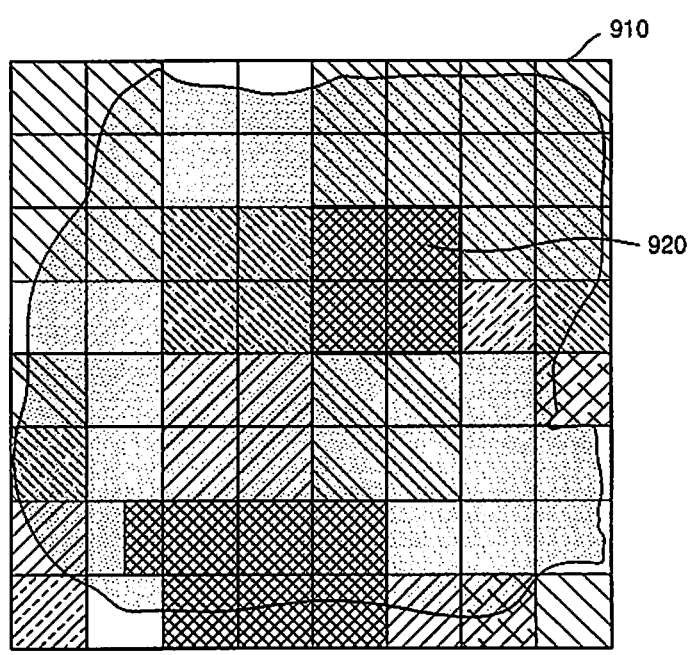
FIG. 9 illustrates an example of allocating a certain area of the second virtual space to another user, which is performed by an user who operates a server, according to an embodiment of the present invention.

FIG. 9 illustrates an example of allocating a certain area of a second virtual space 910 to another user, which is performed by a user who operates the server 140, according to an embodiment of the present invention.

Referring to FIG. 9, an example in which the second virtual area 910 is partitioned into certain areas is shown. The server 140 may allocate a certain area 920 that is partitioned in the second virtual area 910 to another user. The term "allocating" refers to an authority whereby another user may display an object, which may interwork with a service provided by the other user, in the corresponding certain area 920.

The server 140 generates the second virtual area 910, which includes an object that is displayed in the allocated area. Additionally, the server 140 may update the second virtual area 910 by adding a newly displayed object on the already-generated second virtual area 910. Then, the server 140 transmits information about the second virtual area 910 to the terminals 110 that request the information about the second virtual area 910. Accordingly, the second virtual area 910 that includes an object, which interworks with a service provided by another user, is displayed on the terminals 110.

As described above, the terminal 110 allows users to chat and transmit messages between each other, and displays the second virtual area 910, which includes an object that interworks with a service provided by another user. Accordingly, familiarity between a plurality of users may be improved, and a user who operates the server 140 may be provided with a model for generating new profits.

Figure 10:
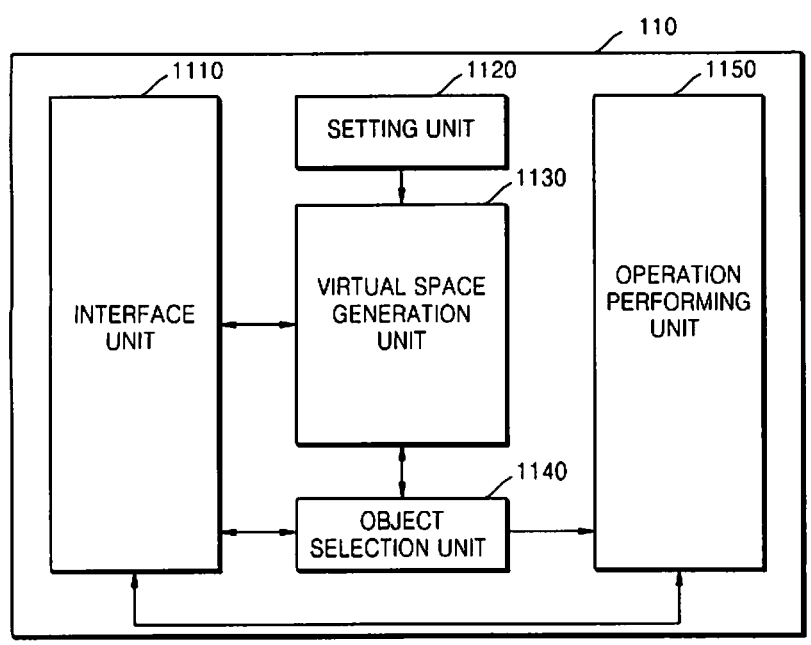
FIG. 10 illustrates an example of a terminal, according to an embodiment of the present invention.

FIG. 10 illustrates an example of the terminal 110 according to an embodiment of the present invention.

Referring to FIG. 10, the terminal 110 includes an interface unit 1110, a setting unit 1120, a virtual space generation unit 1130, an object selection unit 1140, and an operation performing unit 1150.

The terminal 110, shown in FIG. 10, shows only elements according to an embodiment of the present invention. However, it will be understood by those of ordinary skill in the art that, in addition to the elements shown in FIG. 10, other general-use elements may be further included in the terminal 110.

Additionally, the interface unit 1110, the configuration unit 1120, the virtual space generation unit 1130, the object selection unit 1140, and the operation performing unit 1150, which are included in the terminal 110 shown in FIG. 10, may correspond to one or more processors. The processor may be embodied as an array of a plurality of logic gates, or may be embodied as a combination of a general microprocessor and a memory storing a program that is executable by the general microprocessor. Also, it will be understood by those of ordinary skill in the art that the processor may embodied as hardware in another form.

The elements, included in the terminal shown in FIG. 10, perform processes, which are processed in time series according to a sequence provided in the flowcharts shown in FIGS. 2, 5, 6, and 7. Accordingly, it will be understood that descriptions that were provided with regard to the flowcharts shown in FIGS. 2, 5, 6, and 7 may also be applied to the terminal 110 shown in FIG. 10, even if the descriptions are not provided here again.

The interface unit 1110 transceives a signal with the server 140 or another terminal. Additionally, the interface unit 1110 transceives a signal with a user. The interface unit 1110 displays a first virtual space on a screen of the terminal 110. In detail, the interface unit 1110 may include a user interface unit and a communication interface unit.

The user interface unit obtains input information from a user, and displays output information to the user. For example, the user interface unit may include an input/output apparatus, such as a display panel, a mouse, a keyboard, a touchscreen, a monitor, or a speaker, and a software module for driving the same.

Additionally, the communication interface unit may include a modem that is used for facsimile (FAX) transceiving, a network module connected to a network, a universal serial bus (USB) forming a data movement channel with a portable storage medium, or the like.

The setting unit 1120 generates a user account and a character that corresponds to the user account based on an external signal, which is received via the interface unit 1110.

The virtual space generation unit 1130 generates a first virtual space that includes at least one object, which corresponds to an application that is installed in the terminal 110.

The object selection unit 1140 selects one of the at least one object based on location information about the character in the first virtual space.

Based on information about the object that is selected by the object selection unit 1140, the operation performing unit 1150 performs an operation corresponding to the selected object. For example, the operation performing unit 1150 may perform a function of an application, which corresponds to the object that is selected by the object selection unit 1140.

Additionally, the operation performing unit 1150 generates a signal for controlling the interface unit 1110 to shift the first virtual space to the second virtual space and display the second virtual space, by using information about the second virtual space that is received via the interface unit 1110. The second virtual space may include an object, which interworks with the third virtual space that is generated by another user, and an object, which interworks with a service that is provided by another user.

Additionally, the operation performing unit 1110 performs an operation, which is included in a mission, by using an external signal that is received via the interface unit 1110. The term "mission" refers to a mission that is to be performed by a character in the first virtual space.

Although not illustrated in FIG. 10, the terminal 110 may further include the storage unit, and the storage unit may store information about the first virtual space, the user account, and the character.

As described above, according to the one or more of the above embodiments of the present invention, each user of a terminal may configure a unique screen by generating a user account, and generating a character and a virtual space which interwork with the generated user account. Additionally, even when a user owns a plurality of terminals, the user may configure the same screen in the plurality of terminals by using the same user account.

A user may perform a mission in a virtual space by using a character, and chat with or transmit a message to another user. Thus, the user's interest may be aroused. Additionally, the virtual space, generated by the user, may be updated according to a result of performing a mission, and thus, the user's interest may be increased.

A virtual space, displayed on a screen of a terminal, may include an object, which may interwork with a virtual space that is generated by another user or a service that is provided by the other user, as well as an object, which represents an application installed in the terminal. Accordingly, familiarity between a plurality of users may be improved, and a model for generating a new profit may be provided to a subject of operating a server.

In addition, embodiments of the present invention can be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

It should be understood that the embodiments described herein should be considered in a descriptive sense only and not for purposes of limitation. Descriptions of features or aspects within each embodiment should typically be considered as available for other similar features or aspects in other embodiments.

While embodiments of the present invention have been described with reference to the drawings, it will be understood by those of ordinary skill in the art that various changes in form and details may be made therein without departing from the spirit and scope of embodiments of the present invention as defined by the following claims.

What is claimed is:

1. A method of performing an operation by using information that is input to a terminal by a user, the method comprising:
   generating a first virtual space that comprises at least one object;
   displaying the first virtual space on a screen of the terminal;
   selecting one of the at least one object, based on location information about a character in the first virtual space; and
   performing an operation that corresponds to the selected object, based on information about the selected object,
   wherein performing the operation comprises:
      shifting the first virtual space, which is displayed on the screen of the terminal, to a second virtual space comprising at least one object; and
      displaying the second virtual space,
   wherein the at least one object comprised in the second virtual space comprises a first object that shifts, in response to being selected by the user, the second virtual space displayed on the screen of the terminal to a third virtual space that is generated by another terminal of another user,
   wherein the second virtual space is partitioned into certain areas, and
   wherein the certain areas of the second virtual space are allocated to another user.

2. The method of claim 1, wherein the first virtual space comprises objects, which correspond to respective applications that are installed in the terminal, and
   wherein performing the operation further comprises performing a function of an application that corresponds to the selected object.

3. The method of claim 1, further comprising generating a user account and a character that corresponds to the user account, based on a received external signal.

4. The method of claim 1, further comprising:
   determining a mission that will be performed by the character in the first virtual space; and
   updating the first virtual space based on a result of the performing of the mission.

5. The method of claim 1, further comprising transmitting information about the first virtual space to at least one terminal that is connected to a server based on a user account.

6. The method of claim 1, further comprising storing information about the first virtual space.

7. A non-transitory computer-readable storage medium having stored thereon a computer program, which when executed by a computer, performs a method of performing an operation by using information that is input to a terminal by a user, the method comprising:
   generating a first virtual space that comprises at least one object;
   displaying the first virtual space on a screen of the terminal;
   selecting one of the at least one object, based on location information about a character in the first virtual space; and
   performing an operation that corresponds to the selected object, based on information about the selected object,
   wherein performing the operation comprises:
      shifting the first virtual space, which is displayed on the screen of the terminal, to a second virtual space comprising at least one object; and
      displaying the second virtual space,
   wherein the at least one object comprised in the second virtual space comprises a first object that shifts, in response to being selected by the user, the second virtual space displayed on the screen of the terminal to a third virtual space that is generated by another terminal of another user,
   wherein the second virtual space is partitioned into certain areas, and
   wherein the certain areas of the second virtual space are allocated to another user.

8. An apparatus for performing an operation by using input information by a user, the apparatus comprising:
   a user interface;
   a communication interface; and
   at least one processor configured to:
      generate a first virtual space that comprises at least one object;
      control the user interface to display the first virtual space on a screen of the apparatus;
      select one of the at least one object, based on location information about a character in the first virtual space; and
      perform an operation that corresponds to the selected object, based on information about the selected object,
   wherein the at least one processor is configured to perform the operation by:
      shifting the first virtual space, which is displayed on the screen of the terminal, to a second virtual space comprising at least one object; and
      displaying the second virtual space,
   wherein the at least one object comprised in the second virtual space comprises a first object that shifts, in response to being selected by the user, the second virtual space displayed on the screen of the terminal to a third virtual space that is generated by another terminal of another user,
   wherein the second virtual space is partitioned into certain areas, and
   wherein the certain areas of the second virtual space are allocated to another user.

9. The apparatus of claim 8, wherein the first virtual space comprises objects, which correspond to respective applications that are installed in the apparatus, and
   wherein the at least one processor is configured to perform the operation by performing a function of an application that corresponds to the selected object.

10. The apparatus of claim 8, wherein the at least one processor is further configured to generate a user account and a character that corresponds to the user account, based on a received external signal.

11. The apparatus of claim 8, wherein the at least one processor is further configured to perform an operation, which comprises a mission that is transmitted from a server by using a received external signal, and wherein the mission is performed by the character in the first virtual space.

12. The apparatus of claim 8, wherein the at least one processor is further configured to control the communication interface to transmit information about the first virtual space to a server, and wherein the transmitted information is transmitted from the server to each terminal of at least one terminal, which is connected to the server based on a user account.

13. The apparatus of claim 8, further comprising a memory for storing information about the first virtual space.

* * * * *